(12) United States Patent
Stephan et al.

(10) Patent No.: US 11,757,399 B2
(45) Date of Patent: *Sep. 12, 2023

(54) SOLAR MOUNTING ASSEMBLIES

(71) Applicant: PEGASUS SOLAR, INC., Richmond, CA (US)

(72) Inventors: Erich Kai Stephan, Richmond, CA (US); Glenn Harris, Richmond, CA (US)

(73) Assignee: PEGASUS SOLAR, INC., Richmond, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 17/169,046

(22) Filed: Feb. 5, 2021

(65) Prior Publication Data

US 2021/0234500 A1 Jul. 29, 2021

Related U.S. Application Data

(63) Continuation of application No. 15/681,809, filed on Aug. 21, 2017, now Pat. No. 10,998,847.

(Continued)

(51) Int. Cl.
*H02S 20/23* (2014.01)
*F24S 25/30* (2018.01)
(Continued)

(52) U.S. Cl.
CPC ............ *H02S 20/23* (2014.12); *F24S 25/30* (2018.05); *F24S 25/61* (2018.05); *F24S 40/80* (2018.05);
(Continued)

(58) Field of Classification Search
CPC ......... H02S 20/23; H02S 30/00; H02S 20/25; F24S 25/30; F24S 25/61; F24S 40/80; F24S 25/40; F24S 2025/013; Y02B 10/10; Y02B 10/20; Y02E 10/47; F24J 2/5245; F24J 2/5258; H01L 31/048; H01L 31/0483;
(Continued)

(56) References Cited

U.S. PATENT DOCUMENTS

RE23,597 E 12/1952 Bergstein
4,445,656 A 5/1984 Leitch et al.
(Continued)

FOREIGN PATENT DOCUMENTS

CN 103107220 5/2013
DE 20 2010004809 8/2010
(Continued)

OTHER PUBLICATIONS

"Tile Replace for Rails," Pegasus Solar Inc., available at http://pegasussolar.com/tile-replace-rails, Apr. 2017, 11 pages.
"Pegasus Solar Tile Replace Mounting Systems," Pegasus Solar Inc., available at http://pegasussolar.com/residential-tile-roofs/ Sep. 2016, 7 pages.
Extended European Search Report for EP Application No. 15772702.5 dated Nov. 7, 2017, 7 pages.
(Continued)

*Primary Examiner* — Phi D A
(74) *Attorney, Agent, or Firm* — POLSINELLI LLP; Tam Thanh Pham

(57) ABSTRACT

A structural support block cooperates with a cone-shaped protrusion in a roof flashing. The support block and protrusion have a through-hole allowing a fastener to secure the support block and flashing to a roof. Cooperation of the support block and the cone-shaped protrusion in the roof flashing diverts water, particularly on sloped surfaces.

19 Claims, 15 Drawing Sheets

Related U.S. Application Data

(60) Provisional application No. 62/378,553, filed on Aug. 23, 2016.

(51) Int. Cl.

| | | |
|---|---|---|
| *F24S 25/40* | (2018.01) | |
| *F24S 40/80* | (2018.01) | |
| *F24S 25/61* | (2018.01) | |
| *H02S 30/00* | (2014.01) | |
| *F24S 25/00* | (2018.01) | |

(52) U.S. Cl.
CPC .............. *H02S 30/00* (2013.01); *F24S 25/40* (2018.05); *F24S 2025/013* (2018.05); *Y02B 10/10* (2013.01); *Y02B 10/20* (2013.01); *Y02E 10/47* (2013.01)

(58) Field of Classification Search
CPC ............. H01L 31/0482; H01L 31/0484; E04D 13/1473; E04D 1/14; E04D 13/147; F16L 3/06

See application file for complete search history.

(56) References Cited

U.S. PATENT DOCUMENTS

| | | |
|---|---|---|
| 4,788,801 A | 12/1988 | Jones |
| 5,121,583 A | 6/1992 | Hirai et al. |
| 5,603,187 A | 2/1997 | Merrin et al. |
| 5,743,063 A | 4/1998 | Boozer |
| 5,746,029 A | 5/1998 | Ullman |
| 6,360,491 B1 | 3/2002 | Ullman |
| 6,786,012 B2 | 9/2004 | Bradley, Jr. |
| 7,406,800 B2 | 8/2008 | Cinnamon et al. |
| 7,592,537 B1 | 9/2009 | West et al. |
| D608,475 S | 1/2010 | Simmons |
| D608,916 S | 1/2010 | Simmons |
| 7,658,356 B1 | 2/2010 | Nehls |
| 7,752,845 B2 | 7/2010 | Johnson |
| 7,762,027 B1 | 7/2010 | Wentworth et al. |
| 7,832,157 B2 | 11/2010 | Cinnamon et al. |
| 7,857,269 B2 | 12/2010 | Plaisted et al. |
| 7,861,485 B1 | 1/2011 | Wentworth et al. |
| 7,866,098 B2 | 1/2011 | Cinnamon et al. |
| 7,895,808 B1 | 3/2011 | Wentworth et al. |
| 7,905,064 B1 | 3/2011 | Wentworth et al. |
| 7,956,280 B2 | 6/2011 | Kobayashi |
| 7,987,641 B2 | 8/2011 | Cinnamon et al. |
| 8,087,206 B1 | 1/2012 | Worley et al. |
| 8,092,129 B2 | 1/2012 | Wiley et al. |
| 8,100,122 B2 | 1/2012 | Collins et al. |
| 8,109,048 B2 | 2/2012 | West et al. |
| 8,153,700 B2 | 4/2012 | Stearns et al. |
| 8,166,713 B2 | 5/2012 | Stearns et al. |
| 8,353,650 B2 | 1/2013 | Wiley et al. |
| 8,375,654 B1 | 2/2013 | West et al. |
| 8,424,255 B2 | 4/2013 | Lenox et al. |
| 8,464,478 B2 | 6/2013 | Tweedie |
| 8,505,248 B1 | 8/2013 | Leong et al. |
| 8,505,864 B1 | 8/2013 | Taylor et al. |
| 8,539,719 B2 | 9/2013 | McPheeters et al. |
| 8,549,793 B1 | 10/2013 | Gens et al. |
| 8,608,418 B2 | 12/2013 | Wiley et al. |
| 8,631,629 B1 | 1/2014 | Wiener |
| 8,647,009 B2 | 2/2014 | Kobayashi |
| 8,740,163 B1 | 6/2014 | Taylor et al. |
| 8,752,338 B2 | 6/2014 | Schaefer et al. |
| 8,756,881 B2 | 6/2014 | West et al. |
| 8,813,460 B2 | 8/2014 | Cinnamon et al. |
| 8,826,618 B2 | 9/2014 | Stearns |
| 8,869,490 B2 | 10/2014 | Schaefer et al. |
| 8,875,455 B1 | 11/2014 | Yang et al. |
| 8,935,893 B2 | 1/2015 | Liu et al. |
| 8,991,114 B2 | 3/2015 | West |
| 9,010,043 B2 | 4/2015 | Kanczuzewski et al. |
| 9,057,545 B2 | 5/2015 | Stapleton |
| 9,068,339 B2 | 6/2015 | Schaefer et al. |
| 9,120,593 B2 | 9/2015 | Mena et al. |
| 9,121,545 B2 | 9/2015 | Stanley |
| 9,134,044 B2 | 9/2015 | Stearns et al. |
| 9,163,859 B2 | 10/2015 | Prentice |
| 9,169,648 B1 | 10/2015 | Mills |
| 9,171,980 B2 | 10/2015 | Chiu |
| 9,300,244 B2 | 3/2016 | West et al. |
| 9,431,953 B2 | 8/2016 | Stearns et al. |
| 9,473,066 B2 | 10/2016 | Stehan et al. |
| 9,484,853 B2 | 11/2016 | Stapleton |
| 9,496,820 B2 | 11/2016 | Seery et al. |
| 9,556,893 B2 | 1/2017 | Dent |
| 9,624,669 B2 | 4/2017 | Torres et al. |
| 9,647,433 B2 | 5/2017 | Meine et al. |
| 9,722,532 B2 | 8/2017 | Almy et al. |
| 9,755,571 B2 | 9/2017 | Almy et al. |
| 9,800,199 B2 | 10/2017 | Meine et al. |
| 9,806,668 B2 | 10/2017 | Johansen et al. |
| 9,828,773 B2 | 11/2017 | Imai et al. |
| 9,874,021 B2 | 1/2018 | Hudson et al. |
| 9,876,462 B2 | 1/2018 | Hudson et al. |
| 9,876,463 B2 | 1/2018 | Jasmin |
| 9,906,188 B2 | 2/2018 | Almy et al. |
| 9,923,511 B2 | 3/2018 | Xie |
| 9,985,575 B2 | 5/2018 | Stearns et al. |
| 10,027,276 B2 | 7/2018 | Almy et al. |
| D827,160 S | 8/2018 | Menton |
| D827,873 S | 9/2018 | Menton |
| 10,088,201 B2 | 10/2018 | Stephan |
| 10,103,683 B2 | 10/2018 | Wentworth et al. |
| 10,138,634 B2 | 11/2018 | Erekson et al. |
| 10,211,773 B2 | 2/2019 | Jasmin et al. |
| 10,461,682 B2 | 10/2019 | Schuit et al. |
| 10,845,093 B2 | 11/2020 | Stephan |
| 11,437,952 B2 | 9/2022 | Stephan |
| 11,492,167 B2 | 11/2022 | Stephan |
| 2004/0255523 A1 | 12/2004 | Bibaud et al. |
| 2007/0002518 A1 | 1/2007 | Wilk et al. |
| 2009/0001084 A1 | 1/2009 | Wang |
| 2009/0084835 A1 | 4/2009 | Tibbels et al. |
| 2009/0101538 A1 | 4/2009 | Chen et al. |
| 2009/0223857 A1 | 9/2009 | Bowman |
| 2009/0301913 A1 | 12/2009 | Scaletta et al. |
| 2009/0321298 A1 | 12/2009 | Sturm et al. |
| 2010/0084458 A1 | 4/2010 | Corso |
| 2010/0307074 A1 | 9/2010 | Stearns et al. |
| 2010/0275975 A1 | 11/2010 | Monschke et al. |
| 2010/0276558 A1 | 11/2010 | Faust et al. |
| 2011/0000544 A1 | 1/2011 | West |
| 2011/0001030 A1 | 1/2011 | Hochreiter et al. |
| 2011/0100434 A1 | 5/2011 | Van Walraven |
| 2011/0126881 A1 | 6/2011 | Hong et al. |
| 2011/0174947 A1 | 7/2011 | Wu |
| 2011/0214365 A1 | 9/2011 | Aftanas |
| 2012/0031019 A1 | 2/2012 | Stearns et al. |
| 2012/0144760 A1* | 6/2012 | Schaefer ................. F24S 25/20 248/237 |
| 2012/0222380 A1 | 9/2012 | Wentworth et al. |
| 2013/0008102 A1 | 1/2013 | Bindschedler et al. |
| 2013/0011187 A1 | 1/2013 | Schuit et al. |
| 2013/0048815 A1 | 2/2013 | Wagner et al. |
| 2013/0232757 A1 | 9/2013 | Ramos |
| 2013/0291479 A1 | 11/2013 | Schaefer et al. |
| 2013/0340358 A1 | 12/2013 | Danning et al. |
| 2014/0041706 A1 | 2/2014 | Haddock et al. |
| 2014/0042286 A1 | 2/2014 | Jaffari |
| 2014/0110543 A1 | 4/2014 | Aliabadi et al. |
| 2014/0169909 A1 | 6/2014 | Wiley et al. |
| 2014/0305046 A1* | 10/2014 | Stearns ................... E04D 13/10 52/704 |
| 2015/0129517 A1 | 5/2015 | Wildes |
| 2015/0155823 A1 | 6/2015 | West et al. |
| 2015/0249423 A1 | 9/2015 | Braunstein et al. |
| 2015/0280638 A1 | 10/2015 | Stephan et al. |

(56) References Cited

U.S. PATENT DOCUMENTS

| | | |
|---|---|---|
| 2015/0283036 A1 | 10/2015 | Aggarwal et al. |
| 2015/0288320 A1 | 10/2015 | Steams et al. |
| 2015/0361668 A1* | 12/2015 | Stearns .................. E04D 13/00 |
| | | 52/698 |
| 2016/0142006 A1 | 5/2016 | Meine et al. |
| 2016/0226435 A1 | 8/2016 | Almy et al. |
| 2016/0268958 A1 | 9/2016 | Wildes et al. |
| 2017/0093327 A1 | 3/2017 | Stephan et al. |
| 2018/0076756 A1 | 3/2018 | Stephan et al. |
| 2018/0106289 A1 | 4/2018 | Ash et al. |
| 2018/0115274 A1* | 4/2018 | Stephan .................. H02S 20/23 |
| 2018/0191290 A1 | 7/2018 | Guthrie et al. |
| 2018/0274238 A1 | 9/2018 | Aliabadi et al. |

FOREIGN PATENT DOCUMENTS

| | | |
|---|---|---|
| EP | 2363892 | 9/2011 |
| JP | 2017-518474 | 7/2017 |
| WO | WO 2014/028431 | 2/2014 |
| WO | WO 2015/153458 | 10/2015 |
| WO | WO 2016/123452 | 8/2016 |
| WO | WO 2017/062861 | 4/2017 |

OTHER PUBLICATIONS

Chinese Application No. 201580016267.2 Machine generated English translation of the First Office Action and Search Report dated Oct. 27, 2017, 5 pages.

PCT Application No. PCT/US2016/056122 International Preliminary Report on Patentability dated Apr. 10, 2018, 7 pages.

PCT Application No. PCT/US2016/056122 International Search Report and Written Opinion dated Dec. 15, 2016, 9 pages.

PCT Application No. PCT/US2015/023339 International Preliminary Report on Patentability dated Oct. 4, 2016, 7 pages.

PCT Application No. PCT/US2015/023339 International Search Report and Written Opinion dated Jul. 2, 2015, 9 pages.

U.S. Appl. No. 14/671,669 Final Office Action dated Jun. 3, 2016.

U.S. Appl. No. 14/671,669 Office Action dated Nov. 6, 2015.

U.S. Appl. No. 15/287,267 Final Office Action dated May 25, 2018.

U.S. Appl. No. 15/287,267 Office Action dated Oct. 19, 2017.

U.S. Appl. No. 16/146,791 Final Office Action dated Jul. 30, 2020.

U.S. Appl. No. 16/146,791 Office Action dated Feb. 21, 2020.

U.S. Appl. No. 16/818,037 Office Action dated Mar. 3, 2022.

U.S. Appl. No. 16/801,040 Office Action dated May 19, 2022.

* cited by examiner

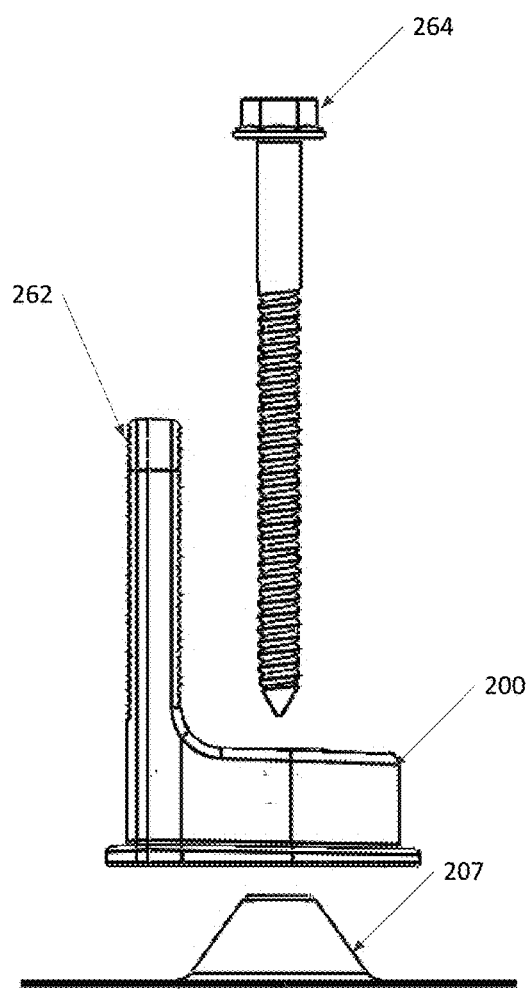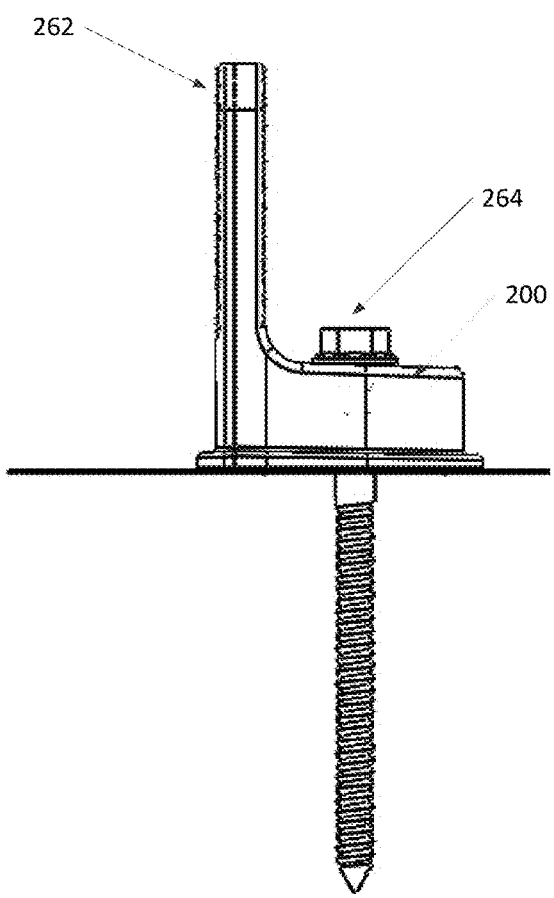
FIG. 2L
FIG. 2M

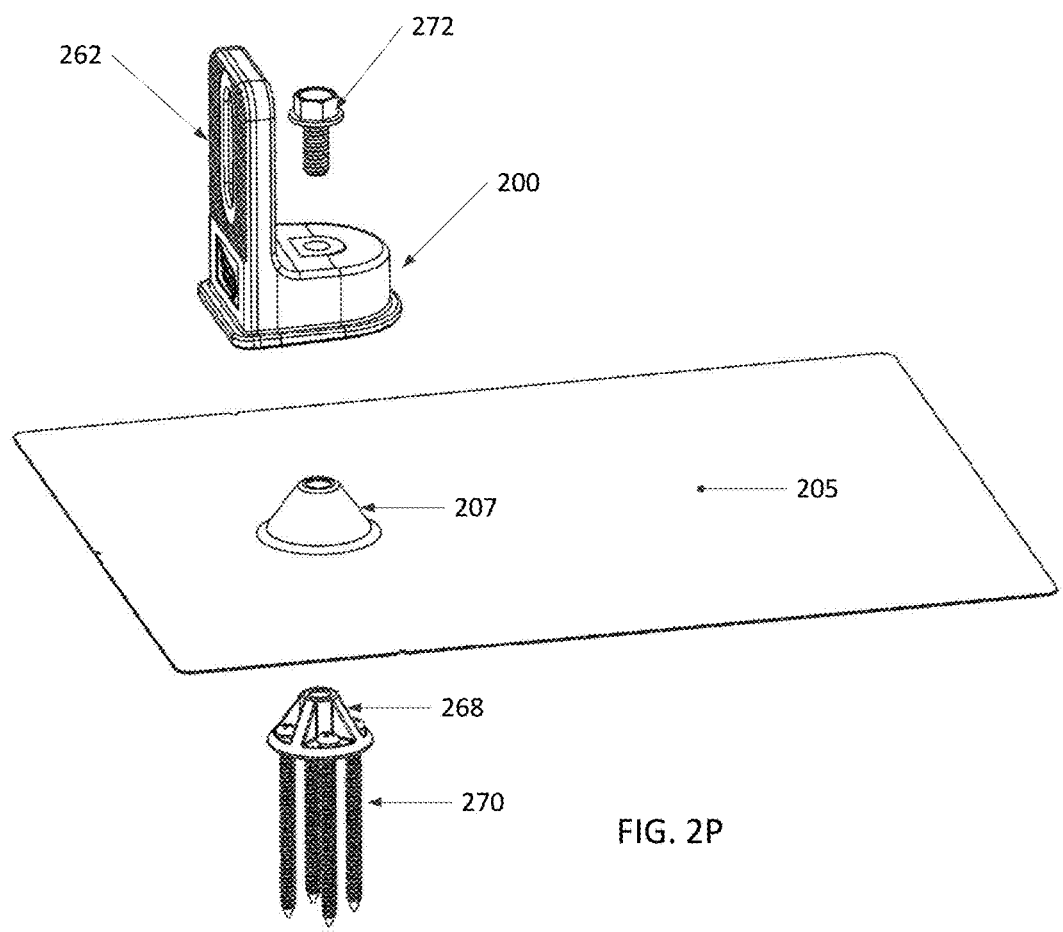
FIG. 2P
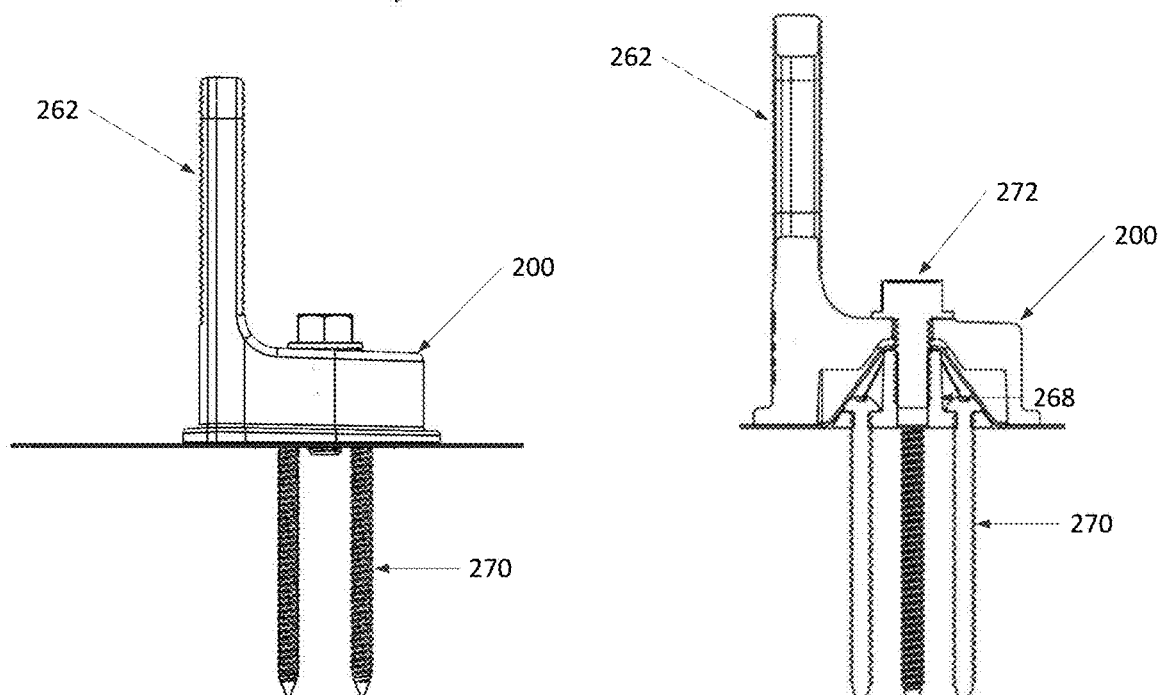
FIG. 2Q
FIG. 2R

SOLAR MOUNTING ASSEMBLIES

CROSS-REFERENCE TO RELATED APPLICATIONS

This application is a continuation of U.S. patent application Ser. No. 15/681,809, filed Aug. 21, 2017, which claims the benefit of U.S. Patent Application No. 62/378,553, filed on Aug. 23, 2016, the full disclosures of each are incorporated herein by reference in their entireties.

BACKGROUND

Solar energy panels are becoming increasingly popular. However, current solar panel mounting solutions are overly complicated, not reliable, and otherwise inadequate. For example, current solar panel mounting solutions involve the use of a lag bolt with a rubber seal to secure a mounting to an installation surface. However, rubber seals degrade from thermal, UV, rain, and ice exposure. Additionally, typical solar panel mounting systems are difficult to level, require numerous points of penetration in an installation surface, and require a plurality of tools for installing the mounting system to an installation surface.

Accordingly, there exists a need in the art for simpler systems and method of mounting solar panels and accessories to an installation surface.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 2L illustrates an exploded view of support block with integrated bracket, a fastener, and flashing;

FIG. 2M illustrates a support block with integrated bracket fastened to a flashing with a fastener;

FIG. 2P illustrates an isometric view of a support block with integrated bracket, a fastener, a cone-shaped attachment block, and flashing;

FIG. 2Q illustrates a support block with integrated bracket fastened to a flashing with a fastener and cone-shaped attachment block;

FIG. 2R illustrates a cut-away view of a support block with integrated bracket, fastened to a flashing with a fastener and cone-shaped attachment block;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
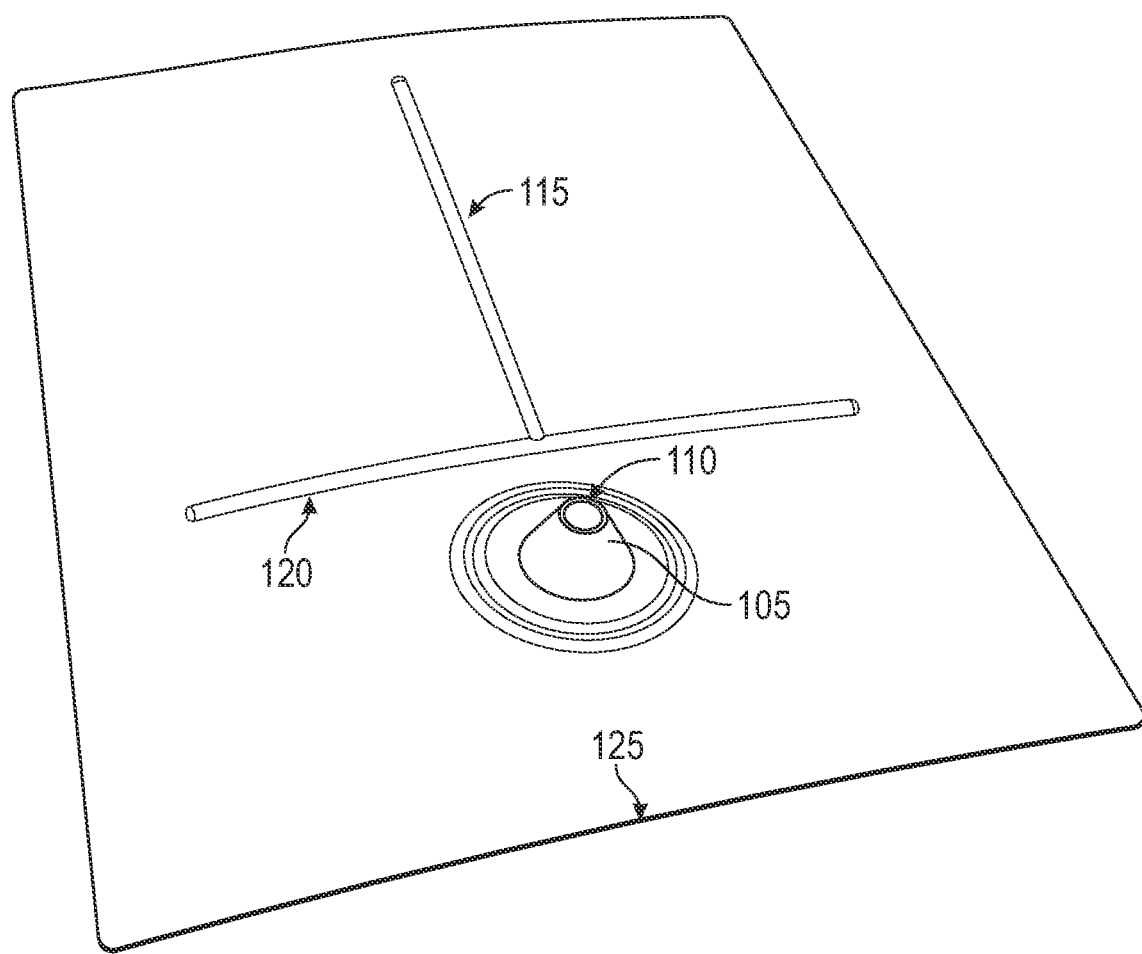
FIG. 1 illustrates a roof flashing with a protrusion having a through-hole.

FIG. 1 illustrates a roof flashing 100 with a protrusion 105 having a through-hole 110. The through-hole 110 provides an entrance for a fastener (e.g. a lag bolt) to secure the flashing and a structural support (e.g. a support block, a mounting assembly base, etc.) to an installation service. Additionally, the flashing 100 can be configured to fit underneath roofing shingles.

In some cases, the protrusion 105 can be cone-shaped to prevent moisture from traversing the protrusion 105. Also, as explained in greater detail below, a structural support diverts water from the cone-shaped protrusion 105. However, even if moisture does reach the cone-shaped protrusion 105, the through-hole 110 in the flashing 100 can be elevated to the top of the cone-shaped protrusion 105, thereby preventing water from reaching the fastener due to the height of the cone-shaped protrusion 105 and the force of gravity. Accordingly, the flashing 100 can couple with a structural support for a solar panel mounting system without relying on a sealant (e.g. silicone sealant) a rubber washer that, as explained above, can degrade over time. Additionally, in some embodiments of the present technology, the flashing 100 and the cone-shaped protrusion 105 is a single formed piece of metal, thereby eliminating the risk of leakage in an area where multiple pieces join (e.g. as a result of thermal expansion, oxidation, etc.). In some cases, the single formed flashing 100, the through-hole 110, and cone-shaped protrusion 105 are formed using a progressive die technique.

The flashing 100 can also include one or more ridges stamped into the flashing 100. As shown in FIG. 1, the flashing 100 includes a T-Shaped ridge configuration with a vertical ridge 115 and a horizontal ridge 120. In some cases, the vertical ridge 115 can be used to align the flashing 100 (e.g. with a roof joist, pilot hole, etc.) during installation. Similarly, the flashing 100 can include a score mark on a terminal edge 125 for alignment. A horizontal ridge 120 can provide the flashing with additional rigidity when a support structure is tightened down onto the flashing 100 and prevent the sides 130, 135 of the flashing 100 from angling upwards (out of the page of FIG. 1) during tightening. In some cases, horizontal ridge 120 may be curved or angled such that water running down a roof does not pool against the height of ridge 120. In some cases, the angles of the cone-shaped protrusion 105, the vertical ridge 115, and the horizontal ridge 120 are selected to allow a stack of flashings to remain compact.

As mentioned above, various structural supports can be used in connection with the flashing 100. A structural support further prevents moisture from traversing the protrusion 105 when the structural support is fastened (e.g. with a lag bolt) onto the protrusion 105 by directing moisture away from the cone-shaped protrusion 105 and the through-hole 110. In some cases, as shown in greater detail below, the structural supports can include internal features to facilitate and increase the effective alignment and seal between the structural support and the flashing 100.

Figure 2A:
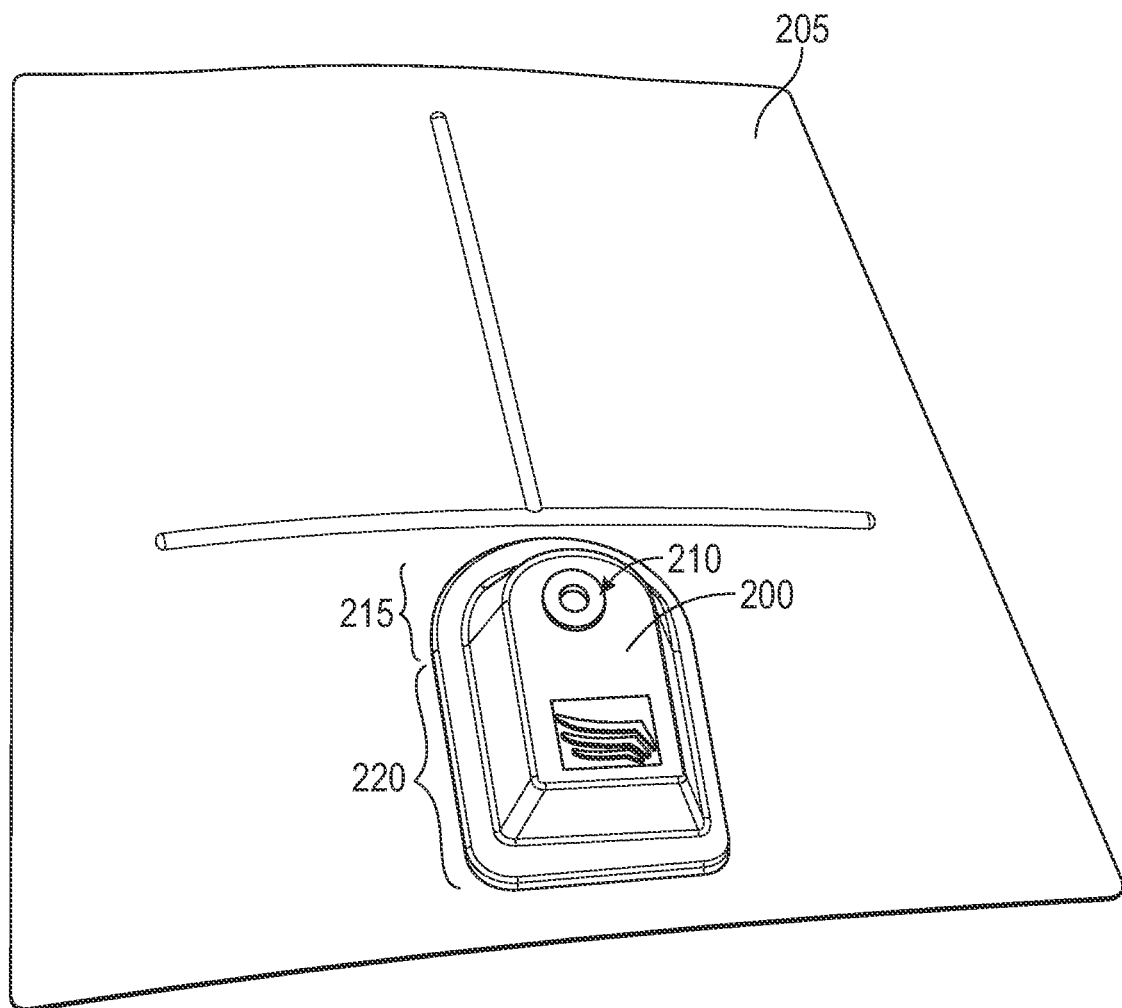
FIG. 2A illustrates a support block covering a through-hole of a flashing.
Figure 2B:
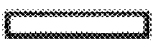
FIG. 2B illustrates an exploded side-view of a support block and washer.
Figure 2B:
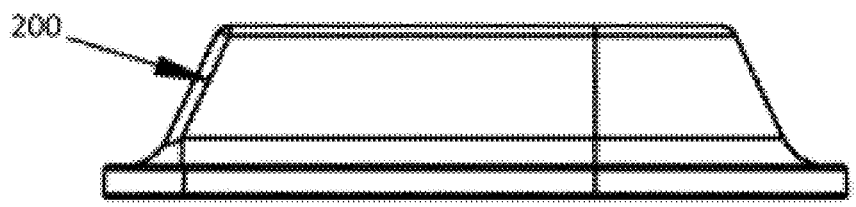
Figure 2C:
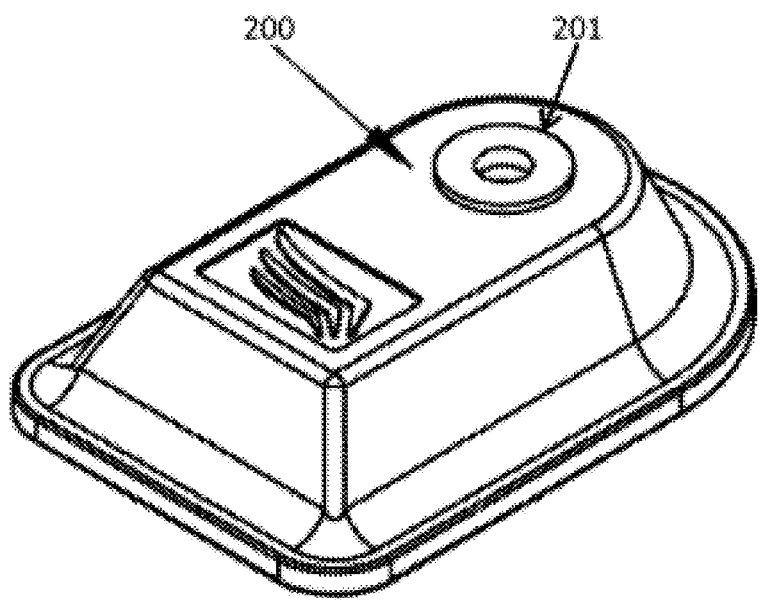
FIG. 2C illustrates an isometric view of a support block and washer.
Figure 2D:
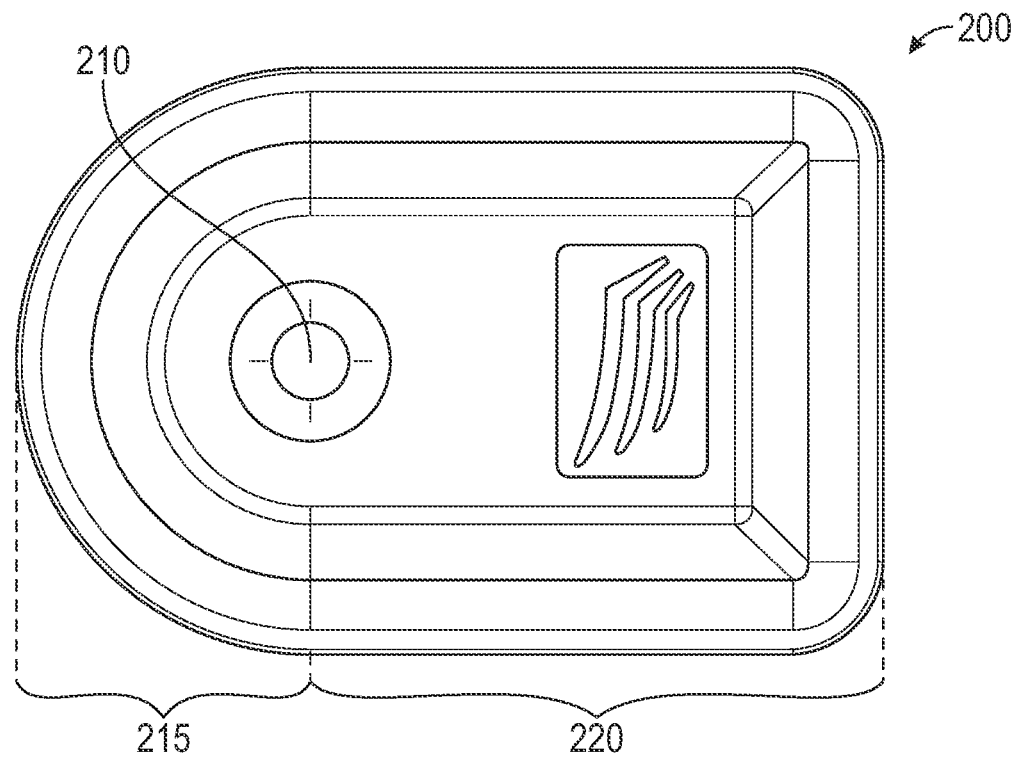
FIG. 2D illustrates a top view of a support block detailing an asymmetric shape with a rounded up-slope portion and an elongated, substantially rectangular down-slope portion.
Figure 2E:
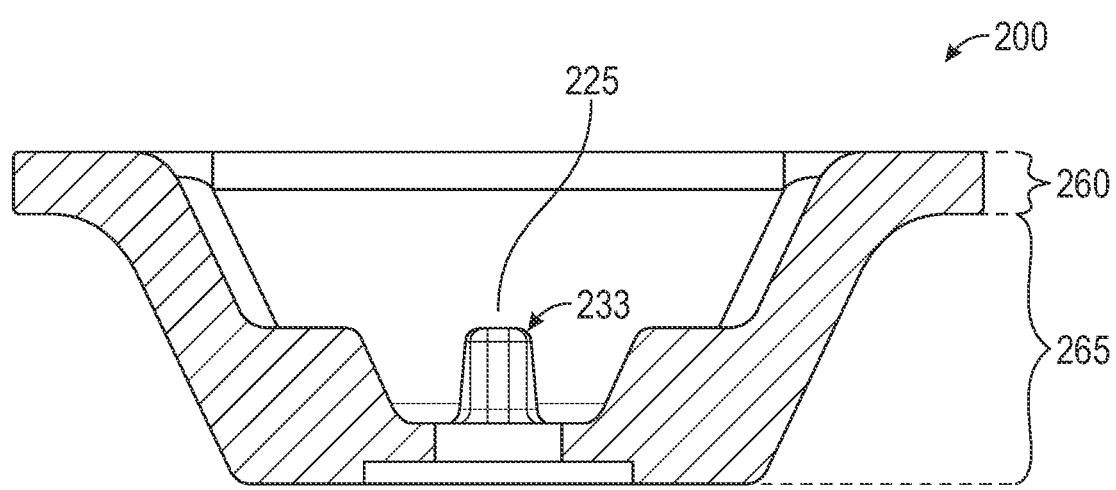
FIG. 2E illustrates a cut-away view of a support block with substantially flat bottom portion, an acute sloping top portion, an internal rib feature, and an internal cavity.
Figure 2F:
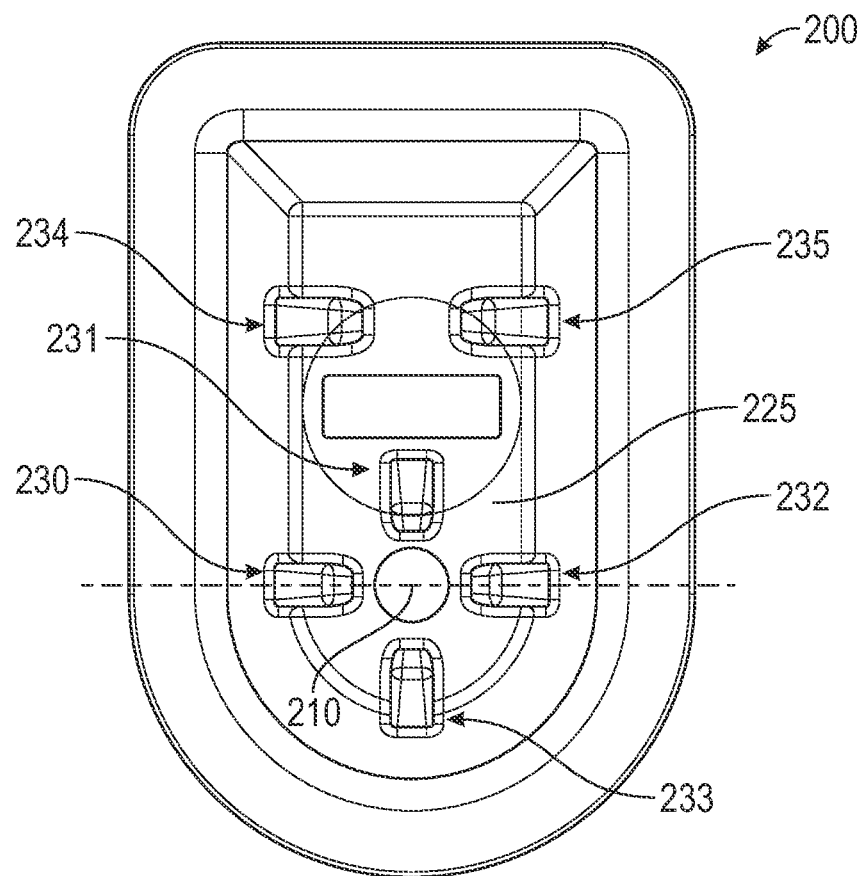
FIG. 2F illustrates a bottom view of the support block showing the internal cavity and a plurality of internal rib features.
Figure 2G:
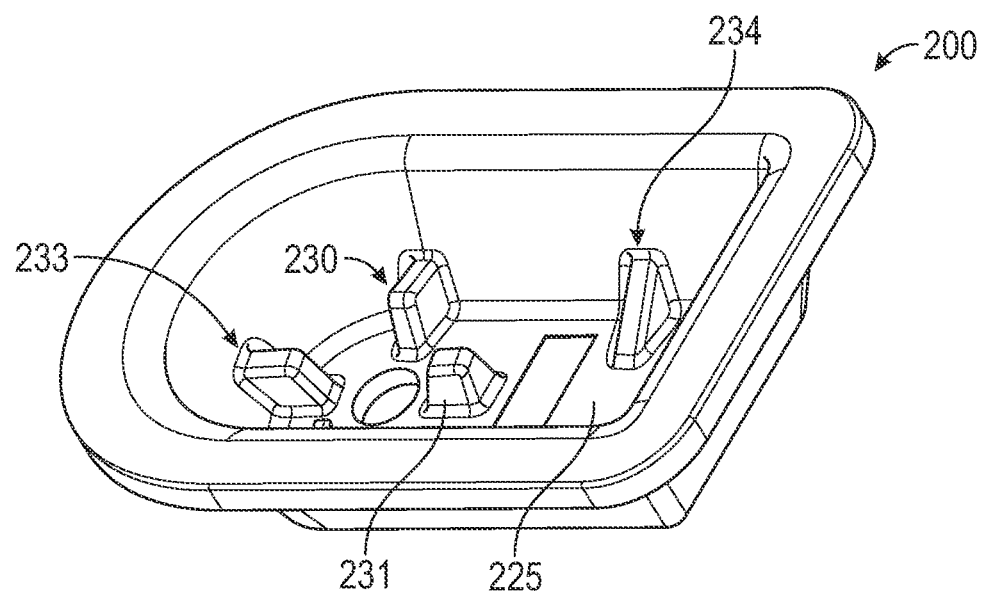
FIG. 2G illustrates an isometric view of the support block showing the internal cavity and a plurality of internal rib features.
Figure 2H:
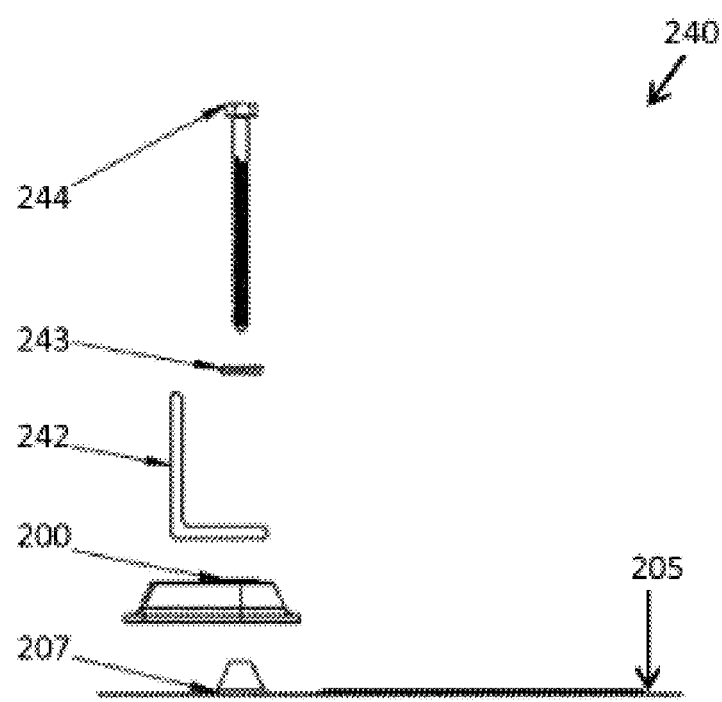
FIG. 2H illustrates an exploded view of a solar mounting assembly including a support block, a flashing, an L-foot bracket, a washer, and a fastener.
Figure 2I:
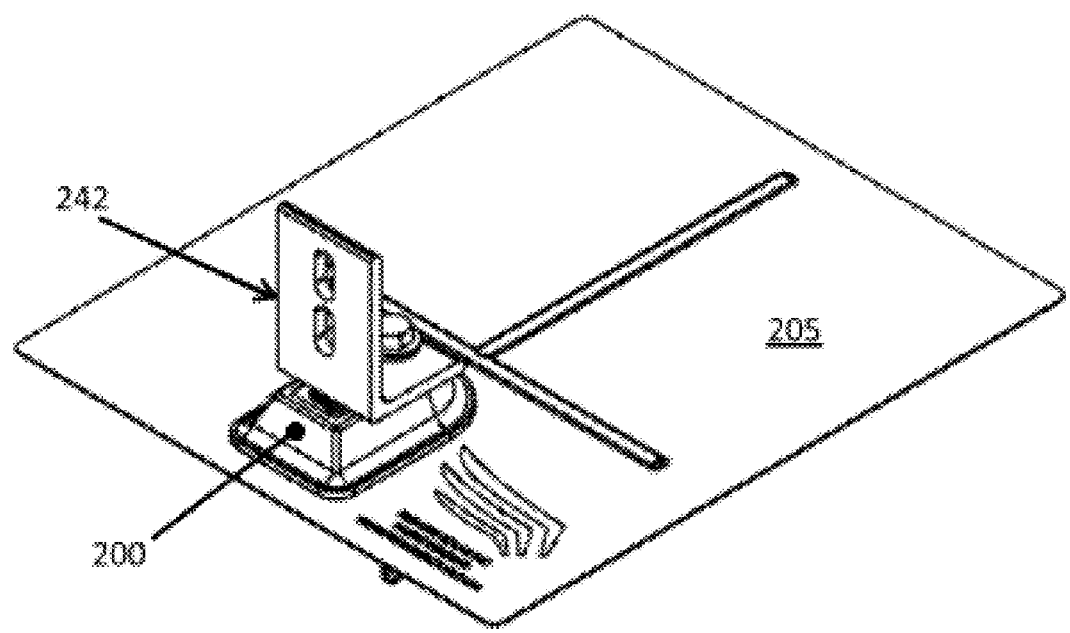
FIG. 2I illustrates a support block and L-foot bracket fastened to a flashing.
Figure 2J:
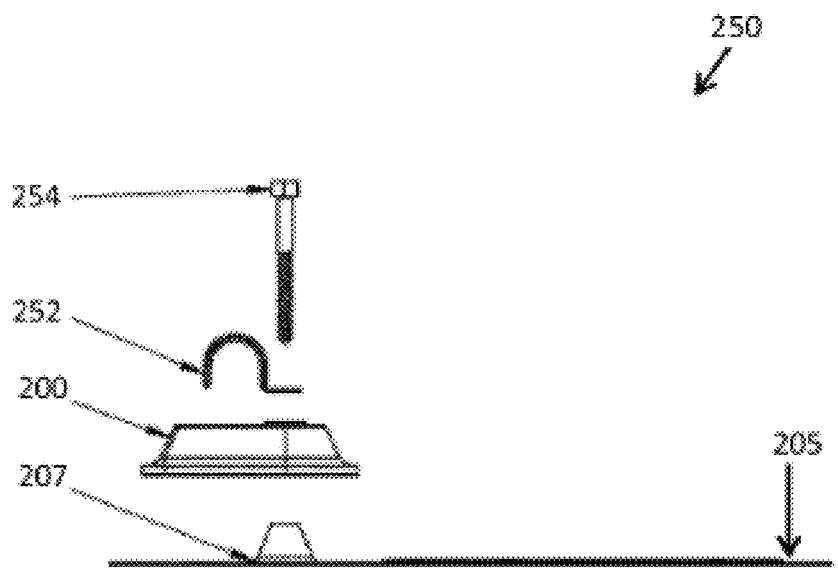
FIG. 2J illustrates an exploded view of a solar mounting assembly including a support block, a flashing, a conduit strap, and a fastener.
Figure 2K:
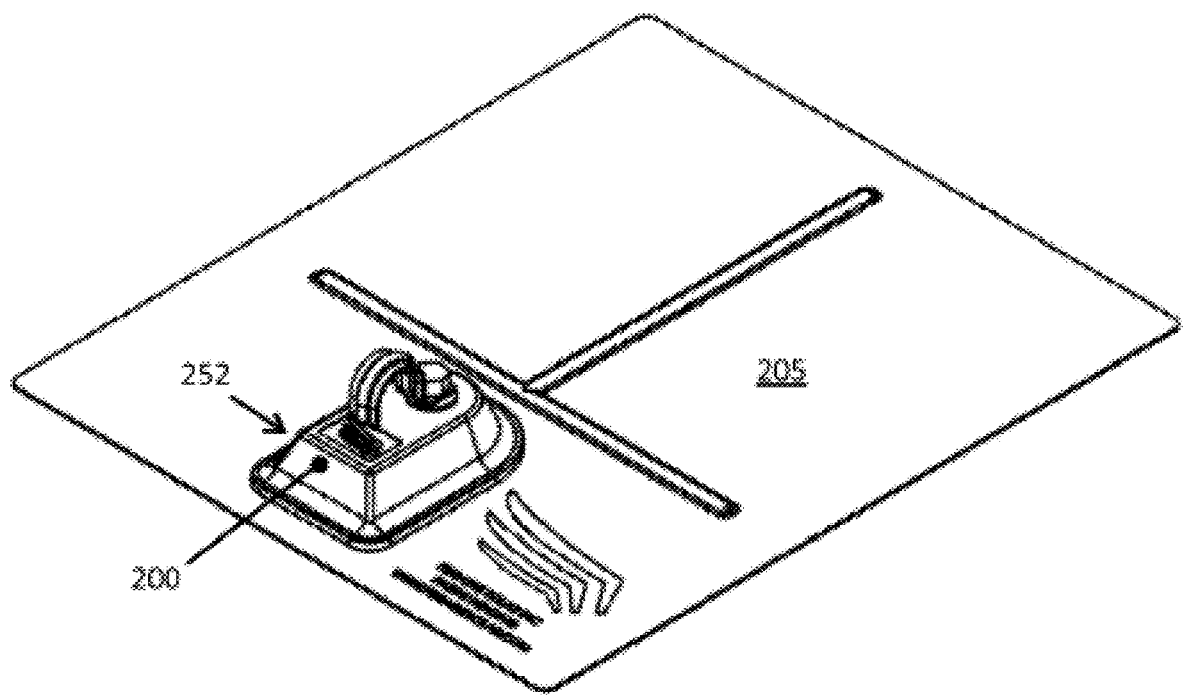
FIG. 2K illustrates a support block and conduit strap fastened to a flashing.
Figure 2N:
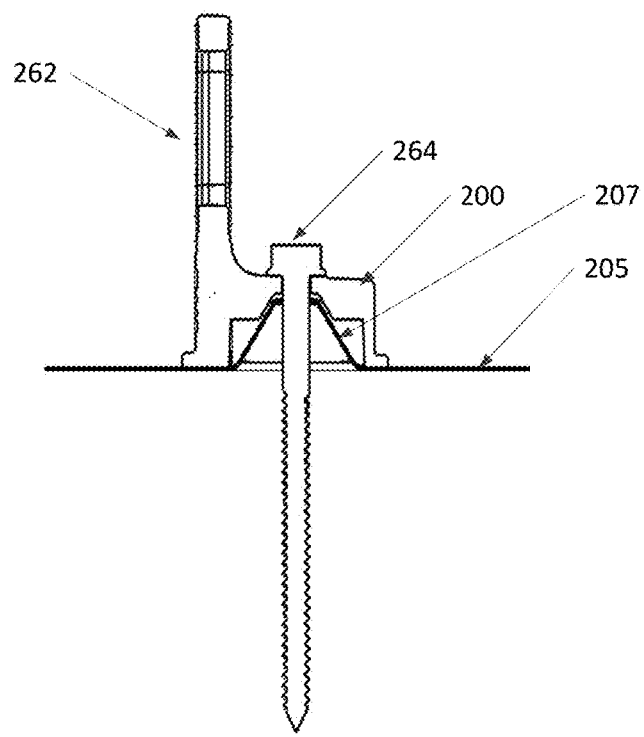
FIG. 2N illustrates a cut-away view of a support block with integrated bracket, fastened to a flashing with a fastener.
Figure 2O:
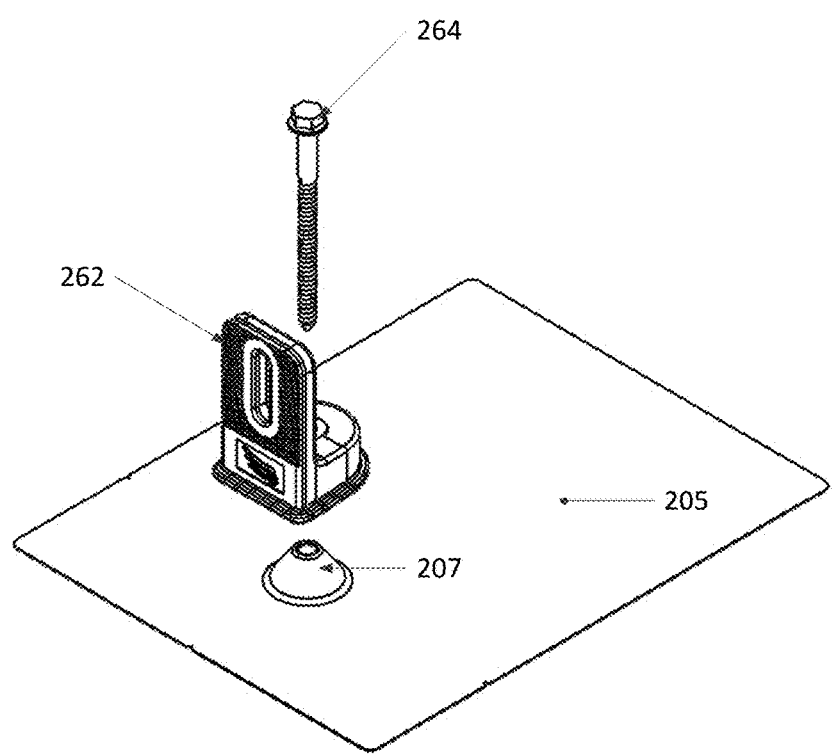
FIG. 2O illustrates an isometric view of a support block with integrated bracket, a fastener, and flashing.

FIGS. 2A-2O illustrate examples of a support block 200 structural support. FIG. 2A illustrates a support block 200 covering a through-hole of a flashing 205. The support block 200 includes an aperture 210 for allowing a fastener (not shown) to be inserted through the aperture 210, through the through-hole of the flashing 205, and coupled with an installation surface. When coupled with an installation surface, the fastener tightly seals the support block 200 onto the flashing 205. As explained in more detail below, a variety of solar mounting accessories can be secured onto the support block 200 with the fastener. Additionally, a grommet, washer, etc. can also be coupled with the aperture 210. FIGS. 2B and 2C illustrate an exploded side-view and an isometric view of a support block 200 and washer 201.

Depending on the orientation of the installation surface, the support block 200 can take various configurations. For example, in the case of a flat installation surface (e.g. a flat commercial building rooftop), the support block 200 can be substantially round to evenly distribute the downward force exerted on the support block 200 through the tightening of a fastener through the aperture 210. In some other cases, the support block 200 is designed specifically to be coupled with a flashing 205 positioned on a sloped installation surface (e.g. a sloped residential building rooftop). In these cases, the support block 200 can be configured with an asymmetric design to strengthen a down-slope portion of the support block 200 to address an increased moment on the down-slope side of the fastener. As shown in FIG. 2A, the shape of the support block 200 is asymmetric with a rounded up-slope portion 215 and elongated, substantially rectangular down-slope portion 220. FIG. 2D illustrates a top view of a support block 200 detailing an asymmetric shape with a rounded up-slope portion 215 and an elongated, substantially rectangular down-slope portion 220.

Although "down-slope" and "up-slope" are used in various portions of the disclosure to refer to a chosen orientation of a structural support, those with ordinary skill in the art having the benefit of the disclosure will readily appreciate that a "down-slope" or "up-slope" portion of a structure can be rotated to other orientations.

The support block 200 can also be configured to compactly stack with similarly configured support blocks. FIG. 2E illustrates a cut-away view a support block 200 with substantially flat bottom portion 260, an acute sloping top portion 265, an internal rib feature 233, and an internal cavity 225. The internal cavity 225 can be configured to house the acute sloping top portion of an additional support block. FIG. 2F illustrates a bottom view of the support block 200 showing the internal cavity 225 and a plurality of internal rib features 230, 231, 232, 233, 234, 235. The internal rib features 230, 231, 232, 233, 234, 235 can be configured to support a top portion of an additional support block when stacked. Furthermore, internal rib features 230, 231, 232, 233 can be configured to facilitate alignment and coupling with the protrusion of a flashing. FIG. 2G illustrates an isometric view of the support block 200 showing the internal cavity 225 and a plurality of internal rib features 230, 231, 232, 233, 234, 235. Additionally, the internal rib features 230, 231, 232, 233 can facilitate rotation of the support block 200 around the protrusion on a flashing.

As explained above, the support block 200 can be used to support a variety of solar mounting accessories. FIG. 2H illustrates an exploded view of a solar mounting assembly 240 including a support block 200 with a protrusion 207, a flashing 205, an L-foot bracket 242, a washer 243, and a fastener 244. The L-foot bracket 242 can be used to secure a variety of solar panel accessories (e.g. junction boxes, inverters, meters, monitoring devices, etc.) to an installation surface. Additionally, the L-foot bracket 242 can be used to secure a wide variety of other hardware and building accessories independent of a solar panel assembly. FIG. 2I illustrates a support block 200 and L-foot bracket 242 fastened to a flashing 205.

FIG. 2J illustrates an exploded view of a solar mounting assembly 250 including a support block 200, a flashing 205 with a protrusion 207, a conduit strap 252, and a fastener 254. The conduit strap 252 can be used to secure electrical conduit used in a solar array system in an elevated position to keep the conduit away from the installation surface (e.g. to prevent wiring from overheating). The support block 200 and conduit strap 252 can be configured to specifically hold electrical conduit at a predetermined height as required by building code, e.g. one inch. Additionally, the conduit strap 252 can be used to secure a wide variety of other hardware and building accessories independent of a solar panel assembly. FIG. 2K illustrates a support block 200 and conduit strap 252 fastened to a flashing 205.

As explained above, the support block 200 (and in some cases, the internal rib features 230, 231, 232, 233) can rotate around the protrusion on a flashing 205. When coupled with a conduit strap 252, rotation of the support block 200 can facilitate installation of conduit in diagonal and irregular orientations over an installation surface.

FIG. 2L illustrates a side exploded view of a solar mounting assembly 260 including a support block 200 with integrated bracket 262, a flashing with a protrusion 207, and a fastener 264. The integrated bracket 262 can be used to secure a wide variety of other hardware and building accessories independent of a solar panel assembly. FIG. 2M illustrates a support block 200 with integrated bracket 262 fastened to a flashing. FIG. 2N illustrates a cut-away view of a support block 200 with integrated bracket 262, fastener 264, flashing and protrusion 207. FIG. 2O illustrates an isometric view of a support block 200 with integrated bracket 262, fastener 264, flashing 205 and protrusion 207.

FIGS. 2P, 2Q and 2R illustrate respective isometric, side and cut-away views of a support block 200 with integrated bracket 262, fastener 272, flashing 205 and protrusion 207. In this embodiment, cone-shaped attachment block 268 is mounted to the roof surface with fasteners 270. Protrusion 207 of flashing 205 cooperates with cone-shaped attachment block 268. Fastener 272 connects the support block 200 to cone-shaped attachment block 268. Fasteners 270 may be threaded with wood-screw threads to engage wood in the roof surface, while fastener 272 may be threaded with machine-screw threads to engage corresponding machine-screw threads in cone-shaped attachment block 268.

Figure 3A:
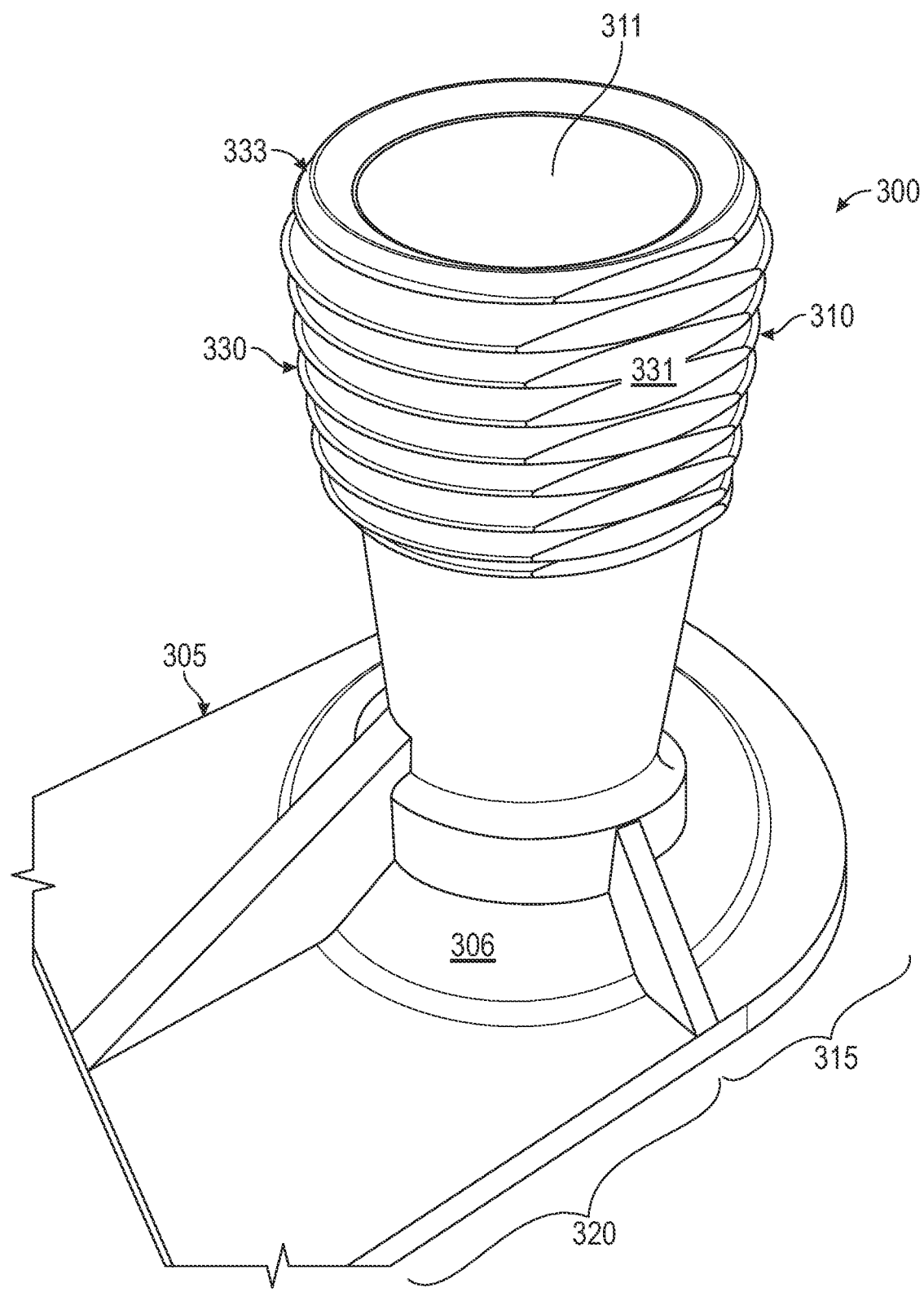
FIG. 3A illustrates a mounting assembly base with a foot and a post.

As mentioned above, various structural supports can be used in connection with the flashing 100. FIGS. 3A-3E illustrate examples of a mounting assembly base 300 structural support. FIG. 3A illustrates a mounting assembly base 300 with a foot 305 and a post 310. The foot 305 can also include a raised portion 306 under the post 310. The raised portion 306 can be substantially conical and can define a cavity (not shown) in the underside of the mounting assembly base 300. The cavity can be configured to fit over a protrusion in a flashing. Furthermore, the cavity can include internal rib features for facilitating alignment with the protrusion on the flashing.

In some cases, the foot 305 is configured with an asymmetric design to strengthen a down-slope portion of the foot 305 to address an increased moment on the down-slope side of the fastener. As shown in FIG. 3A, the shape of the foot 300 is asymmetric with a rounded up-slope portion 315 and elongated, substantially rectangular down-slope portion 320. Additionally, the foot 300 can be configured with one or more ridges for providing additional forces on the mounting assembly base 300. In some cases, a down-slope ridge 320 can be configured to provide additional support against torque from a clamp assembly (shown below) and a solar panel frame and panel coupled with the mounting assembly base 300.

In some cases, the mounting assembly base 300 is configured with threads 330 on the post 310 for coupling with a threaded support arm (shown below). In some cases, the threads 330 are truncated on the sides 331, 333 of the post 310, thereby facilitating a metal injection molding or die casting process for forming the mounting assembly base 300 and the threads 330.

In some cases, the post 310 of the mounting assembly base 300 is configured with a substantially hollow portion 311, thereby allowing a fastener to be inserted therein. Likewise, the foot 305 portion of the mounting assembly base is configured with a cavity for allowing the fastener to extend out of the mounting assembly base 300, through a protrusion in a flashing, and into an installation surface. In some cases, the hollow portion 311 of the post 310 is configured for allowing a socket tool to be inserted into the hollow portion 311 and allowing the socket tool to tighten and loosen a fastener inserted therethrough.

Figure 3B:
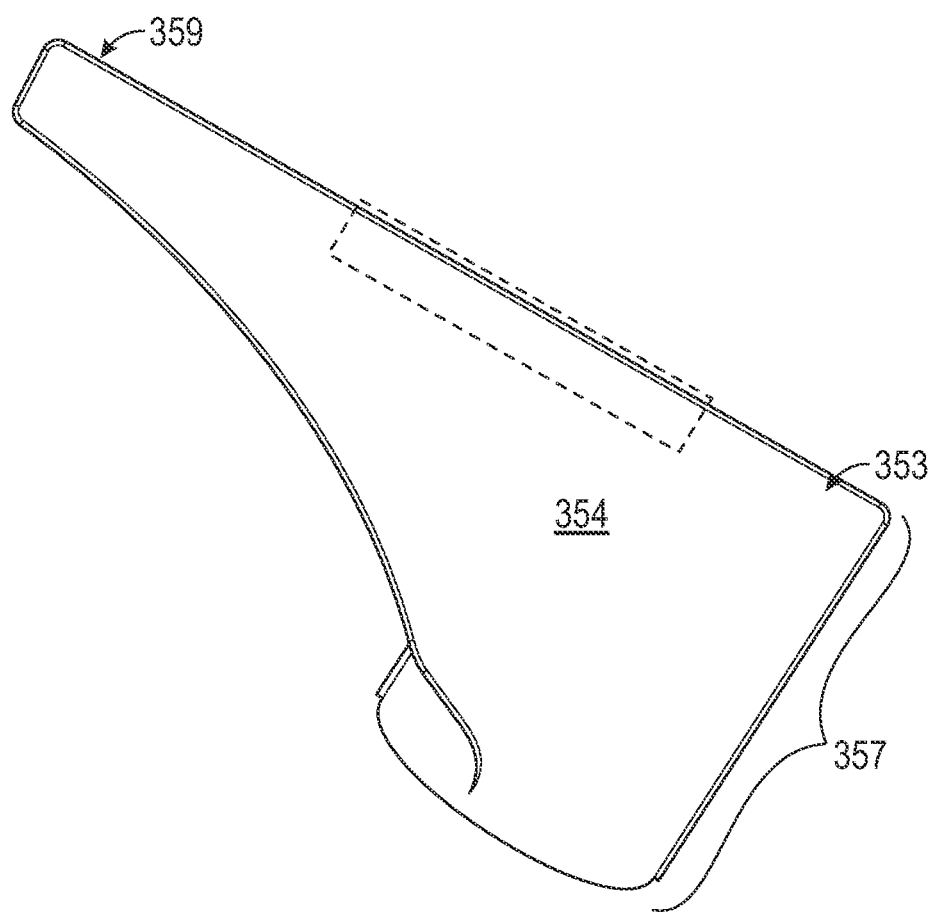
FIG. 3B illustrates a support arm.

The threads 330 of the post 310 are configured to coupled with internal threads of a support arm that supports a solar panel frame clamping assembly. FIG. 3B illustrates a support arm 354 according to some embodiments of the present technology. The support arm 354 includes a threading section 357, a cantilever arm 359, and an extended slot between the top surface to the bottom surface of the cantilever arm 359 (shown in dashed line) running a length of the cantilever arm 359. A top surface 353 of the threading section 357 is covered such that the support arm 354 seals the hollow portion 311 of the post 310 when coupled with the post 310. Also, in some cases, the threading section 357 includes internal threads that are recessed within the threading section 357 such that the support arm 354 can be placed onto the post 310 and supported before the threads interact.

Figure 3C:
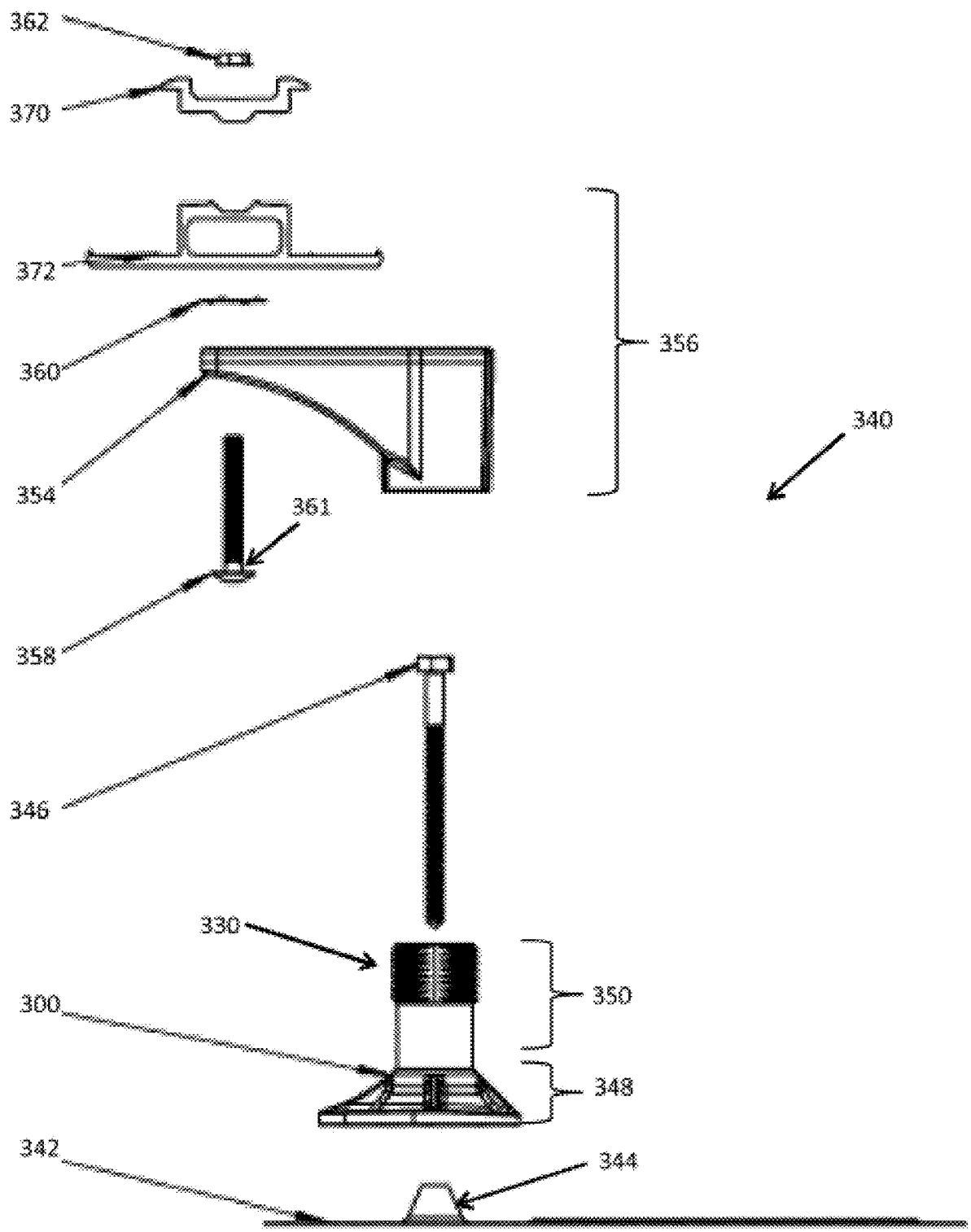
FIG. 3C illustrates an exploded view of a solar panel mounting assembly.

FIG. 3C illustrates an exploded view of a solar panel mounting assembly 340. The solar panel mounting assembly 340 includes a flashing 342 with a protrusion 344 having a through-hole (not shown), a mounting base assembly 300, and a fastener 346. The mounting base assembly 300 includes a foot 348 and a post 350. The foot 348 of the mounting base assembly 300 includes a cavity in its underside that fits over the protrusion such that the mounting base assembly 300 seals the through-hole from exposure to water, debris, etc. In some cases, the cavity in the underside of the foot 348 of the mounting base assembly 300 includes internal rib features that facilitate alignment and coupling with the protrusion. The post 350 of the mounting base assembly 300 can be substantially hollow such that a fastener 346 can be inserted through the mounting base assembly 300, through the through-hole in the flashing 342, and into an installation surface.

The solar panel mounting assembly 340 also includes a support arm 354 with internal threads (not shown) configured to thread onto the external threads 330 of the post 310. Also, the solar panel mounting assembly 340 includes a clamp assembly 356 that can be fastened to support arm 354 with fasteners 358, 360, 362. For example, the fasteners 358, 360, 362 can include a bolt 358, a washer 360, and a nut 362. In some cases, the bolt 358 includes a square section 361 that fits into the slot 355 in the cantilever arm 359. The coupling of the square section 361 in slot 355 in the cantilever arm 359 allows the bolt to remain fixed will the nut 362 is fastened thereto. Also, the nut 362 can be the same size as the head of the fastener 346 such that fastening the mounting base assembly 300 to an installation surface and assembly of the solar panel mounting assembly 340 can be performed with a single tool.

In some cases, the slot 355 in the cantilever arm 359 has a trapezoidal profile and the bolt 358 has a corresponding trapezoidal shape section under the head to fit into the slot 355.

The clamp assembly 356 can include a top clamp 370 and a bottom clamp 372 which, when fastened together, clamp a frame of a solar panel module (not shown). Each of the top clamp 370 and the bottom clamp include slots along their length (in and out of the page of FIG. 3C). The slot 355 in the cantilever arm 359 of the support arm 354 and the slots in the top clamp 370 and a bottom clamp 372 allow the clamp assembly 356 to be adjusted in any direction in a plane. Also, the support arm 354 is adjustable vertically by threading up and down on the post 350 of the mounting base assembly 300—without the need for an additional tool. The combination of the vertical adjustability of the support arm 354 and the planar adjustability of the clamp assembly 356 allows the solar panel mounting assembly 340 to self-level and conveniently adjusts to capture and align with solar panel frames laid out on an installation surface. In the field, this flexibility in aligning the clamp assembly 356 without the use of tools is highly advantageous to account for human error, to adjust the cantilever distance of a solar panel frame, etc.

Figure 3D:
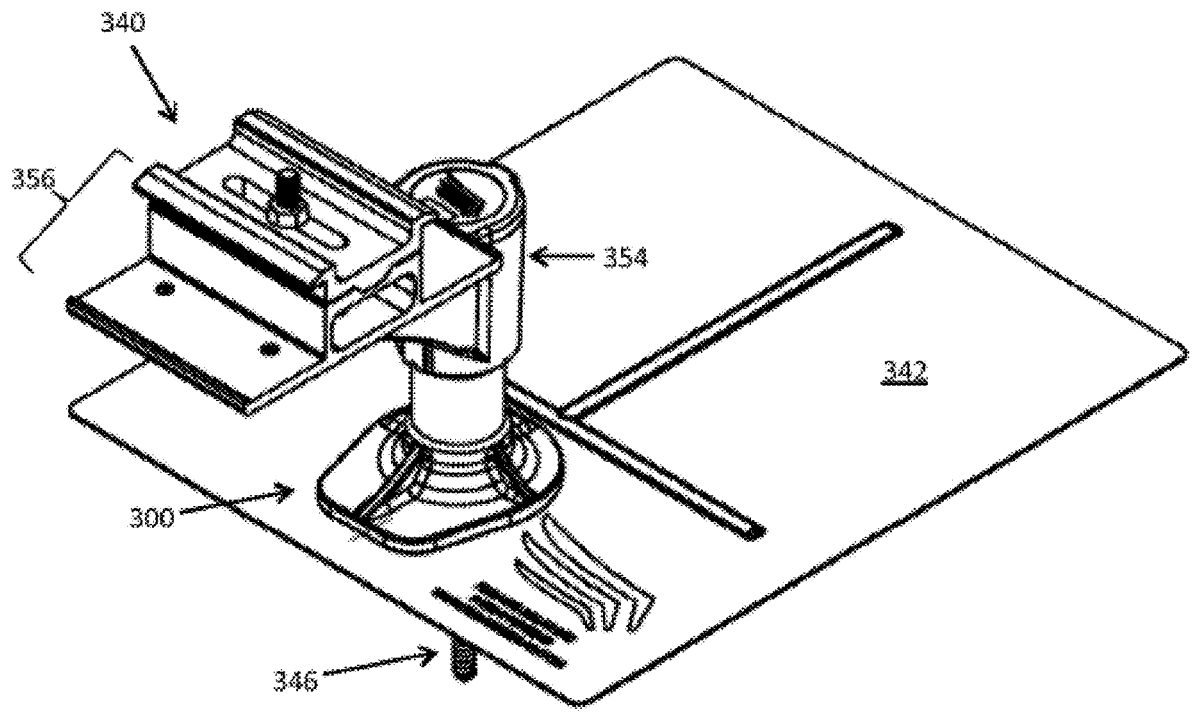
FIG. 3D illustrates an assembled solar panel mounting assembly with a clamp assembly.
Figure 3E:
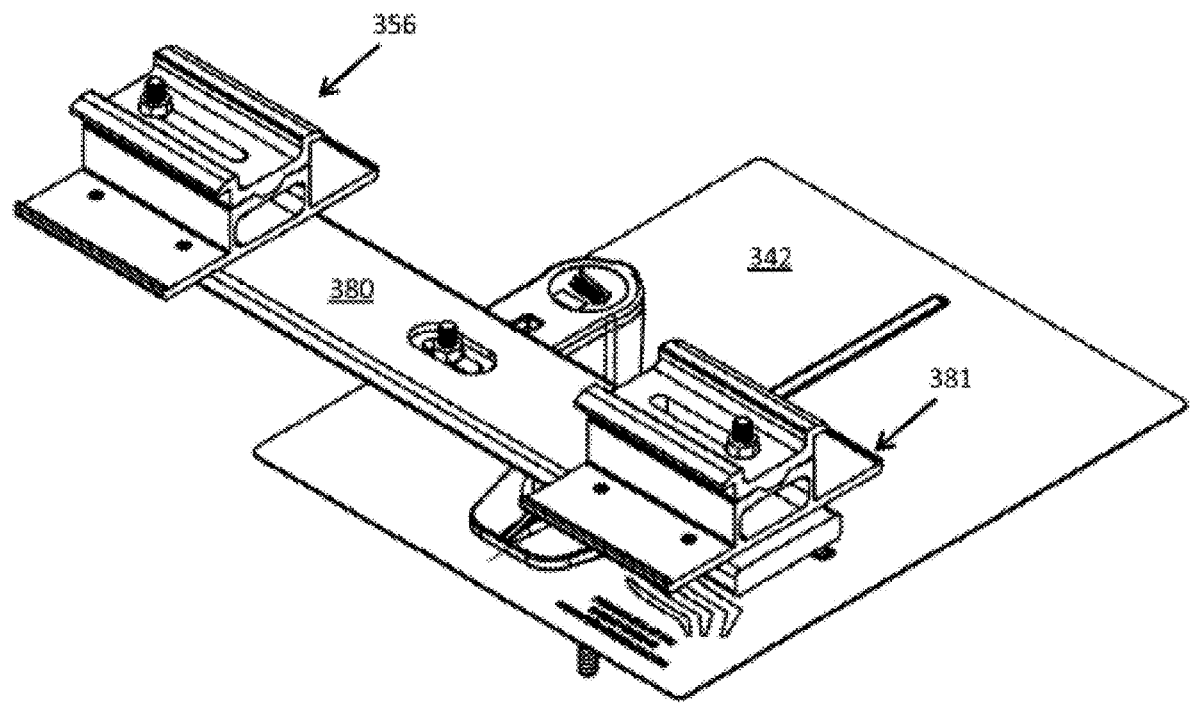
FIG. 3E illustrates an assembled solar panel mounting assembly with a spanner bar and two clamp assemblies.

FIG. 3D illustrates an assembled solar panel mounting assembly 340 with a clamp assembly 356. FIG. 3E illustrates an assembled solar panel mounting assembly with a spanner bar 380 and two clamp assemblies 356, 381.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A solar mounting assembly comprising:
   a flashing comprising a substantially flat sheet, the flashing having an upward-facing tapered protrusion and a through-hole in a center of the tapered protrusion; and
   a support block that is separate from the flashing, the support block being cast in a single piece and having:
      a bracket having at least one grooved surface that is cast into the support block, the grooved surface configured to engage solar mounting accessories, and a longitudinal slot that is cast into the support block, the longitudinal slot configured to secure the solar mounting accessories to the support block;
      a top surface integrated with the bracket;
      an outer side surface on an up-slope portion of the support block, the outer side surface cast into the support block, the outer side surface forming an obtuse angle with the top surface;
      an aperture that is cast into the support block, the aperture disposed through the top surface, wherein the aperture is configured to align with the through-hole in the center of the tapered protrusion; and
      an internal cavity that is cast into the support block, wherein the internal cavity is configured to accommodate the tapered protrusion of the flashing when the support block is placed on the flashing over the tapered protrusion such that the support block compresses onto the flashing when a first fastener is inserted through the aperture and the through-hole, wherein the internal cavity includes a plurality of internal ribs configured to align with the tapered protrusion.

2. The solar mounting assembly of claim 1, wherein the flashing further comprises a first notch feature configured as an alignment guide.

3. The solar mounting assembly of claim 1, wherein the flashing further comprises a ridge feature configured to provide structural support when the first fastener is compressed over the tapered protrusion and the through-hole onto the flashing.

4. The solar mounting assembly of claim 1, wherein the flashing is a substantially uniform thickness.

5. The solar mounting assembly of claim 1, wherein a top of the tapered protrusion is flat and substantially parallel with the flashing.

6. The solar mounting assembly of claim 1, wherein the bracket is configured in an asymmetrical orientation with the outer side surface on the up-slope portion and an elongated, substantially rectangular portion on a down-slope portion of the support block.

7. The solar mounting assembly of claim 1, wherein the internal cavity includes a plurality of internal ribs configured to provide structural support for a cone-shaped attachment block.

8. The solar mounting assembly of claim 1, wherein the first fastener is flanged.

9. The solar mounting assembly of claim 1, wherein the first fastener has a cavity on an underside of a flange to accommodate a flexible washer, wherein the flexible washer is compressed between the flange and the support block when the solar mounting assembly is installed on an installation surface.

10. The solar mounting assembly of claim 1, further comprising a substantially planar outer side surface on a down-slope portion of the support block, the substantially planar outer side surface forming an obtuse angle with the top surface.

11. The solar mounting assembly of claim 10, wherein the support block further comprises:
    a second substantially planar outer side surface that forms an obtuse angle with the top surface.

12. A solar mounting assembly comprising:
    a support block cast in a single piece and having:
       a bracket having at least one grooved surface that is cast into the support block, the grooved surface configured to engage solar mounting accessories, and a longitudinal slot that is cast into the support block, the longitudinal slot configured to secure the solar mounting accessories to the support block;
       a top surface integrated with the bracket;
       an outer side surface on an up-slope portion of the support block, the outer side surface cast into the support block, the outer side surface forming an obtuse angle with the top surface;
       an aperture that is cast into the support block, the aperture disposed through the top surface, wherein the aperture is configured to align with a through-hole in a flashing, the flashing having an upward-facing tapered protrusion; and
       an internal cavity that is cast into the support block, wherein the internal cavity includes a plurality of internal ribs configured to align with the tapered protrusion.

13. The solar mounting assembly of claim 12, further comprising:
    a cone-shaped attachment block, wherein the cone-shaped attachment block comprises:
       a plurality of peripheral apertures configured to cooperate with second fasteners when the second fasteners are fastened into an installation surface; and
       a central aperture, the central aperture having internal threads configured to cooperate with a first fastener passing through the aperture in the top surface of the support block.

14. The solar mounting assembly of claim 12, wherein two opposing sides of the bracket taper toward each other in a direction away from the top surface.

15. The solar mounting assembly of claim 12, wherein the bracket further comprises an inset recess on sides of the longitudinal slot.

16. The solar mounting assembly of claim 15, wherein the inset recess is configured to accept a flange of a fastener, and the inset recess is curved on at least one end of the longitudinal slot.

17. The solar mounting assembly of claim 12, wherein the longitudinal slot is open on one end.

18. The solar mounting assembly of claim 12, wherein the support block is aluminum.

19. The solar mounting assembly of claim 12, wherein the top surface has a recessed surface concentric with the aperture to receive a washer.

* * * * *